March 19, 1929.  J. C. KARCHER  1,706,066
METHOD AND APPARATUS FOR LOCATING GEOLOGICAL FORMATIONS
Filed March 30, 1926  2 Sheets-Sheet 1
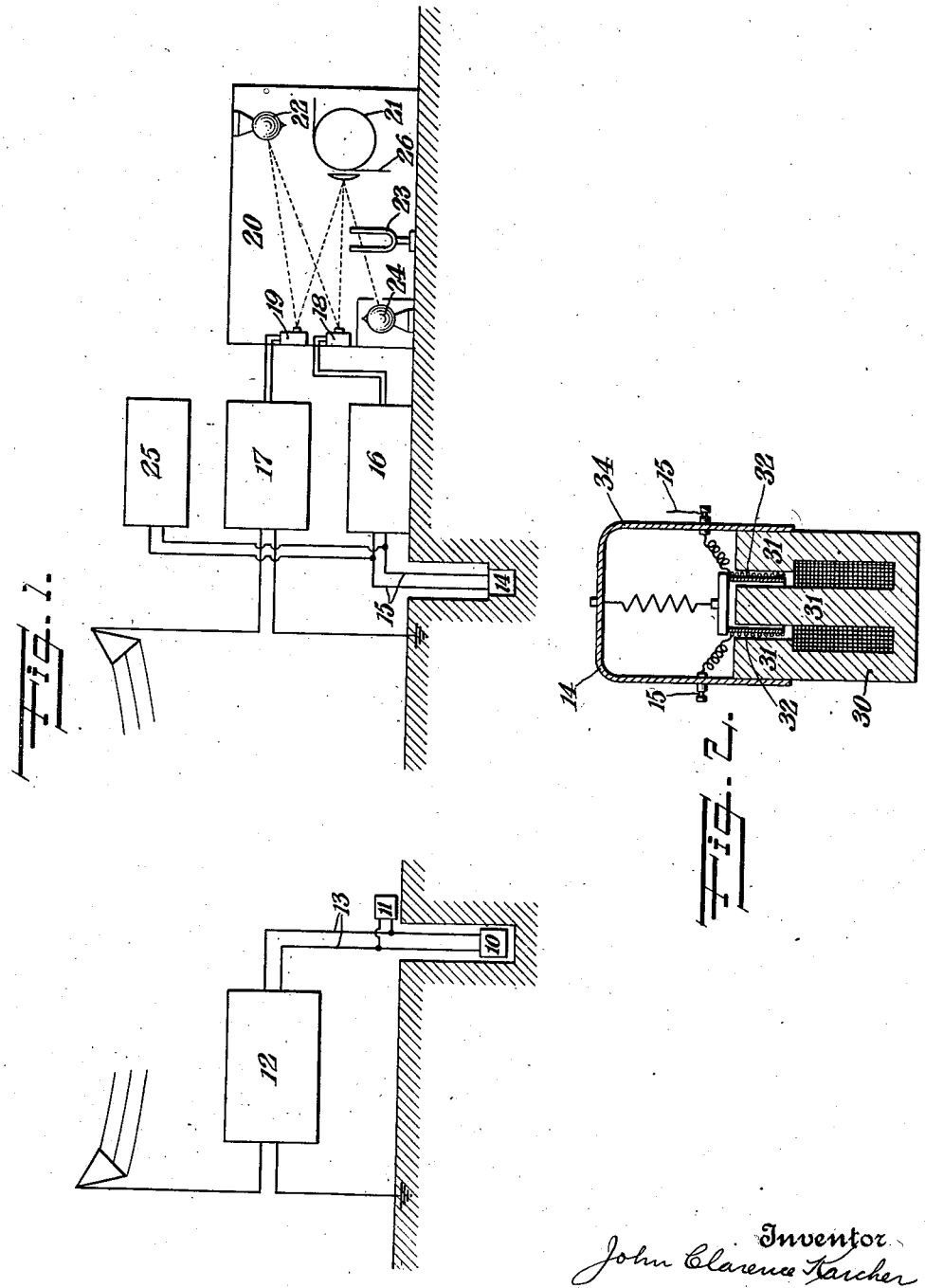
Inventor
John Clarence Karcher
By his Attorneys
Kenyon & Kenyon March 19, 1929.  J. C. KARCHER  1,706,066
METHOD AND APPARATUS FOR LOCATING GEOLOGICAL FORMATIONS
Filed March 30, 1926  2 Sheets-Sheet 2
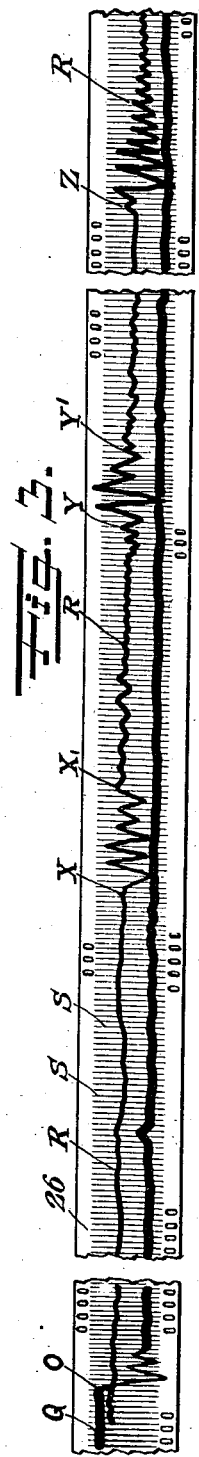
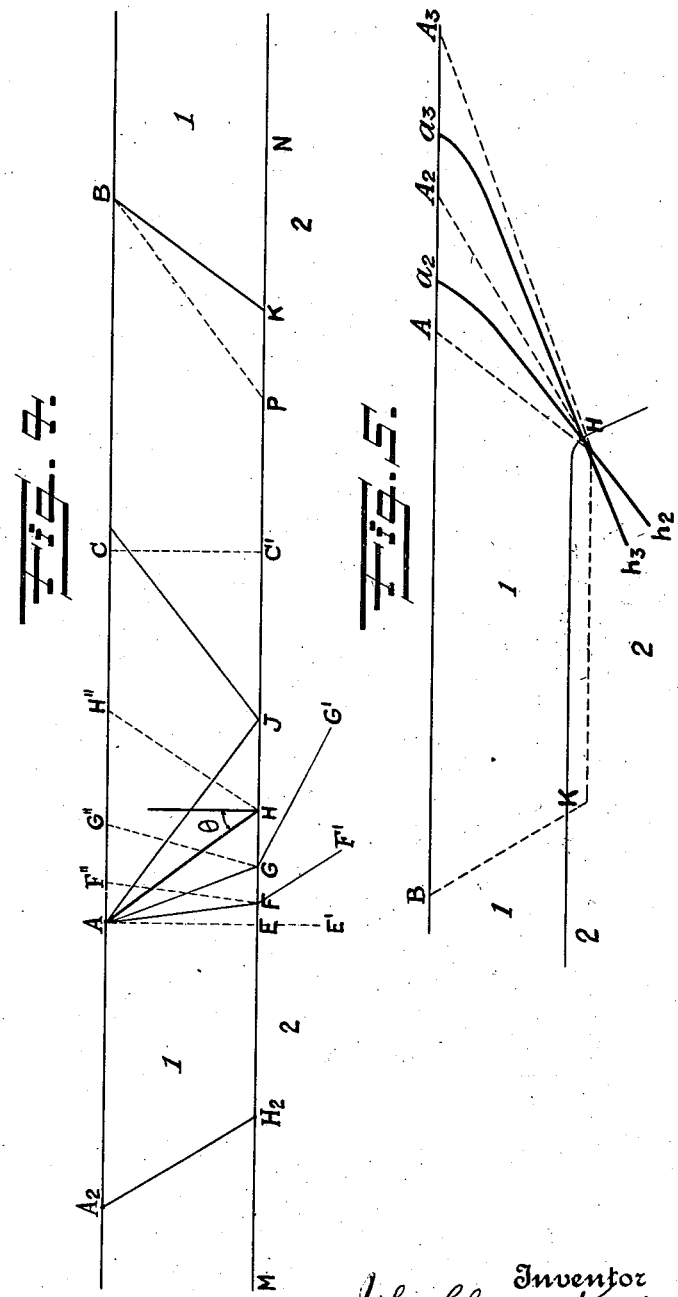
Inventor
John Clarence Karcher
By his Attorneys
Kenyon & Kenyon Patented Mar. 19, 1929.

1,706,066

UNITED STATES PATENT OFFICE.

JOHN CLARENCE KARCHER, OF MONTCLAIR, NEW JERSEY, ASSIGNOR TO GEOPHYSICAL RESEARCH CORPORATION, OF NEW YORK, N. Y., A CORPORATION OF NEW JERSEY.

METHOD AND APPARATUS FOR LOCATING GEOLOGICAL FORMATIONS.

Application filed March 30, 1926. Serial No. 98,423.

This invention relates to methods of and apparatus for determining the character, location and depth of geological formations beneath the surface of the earth and particularly to the locating of formations having sound transmitting characteristics differing from those of the surrounding terrain. The invention has special application to the location of salt domes, anticlines and other structures favorable to the accumulation of petroleum under the earth's surface.

It has heretofore been recognized that subsurface formations may be investigated by observing the velocity of sound waves transmitted through the same from sending to receiving stations where one or more of the stations are located in deep borings in the earth and the stations are approximately on opposite sides of the formation under examination. In my present invention I make use of sound waves transmitted through the earth, but I have discovered that by a novel arrangement and combination of sending and receiving devices I am able to take advantage of principles of sound propagation not heretofore used in this or similar connections, so far as I am aware, with the result that I obviate the necessity of deep borings and by a series of observations made at stations located substantially at the surface of the earth I am able to determine accurately the location, size, character and depth of the geological formations under the surface of the earth, provided only that the sub-surface formations have the characteristic of transmitting sound more rapidly than the surrounding terrain and that the surrounding terrain be one through which sound will travel with substantially uniform velocity. Such conditions are often found in geological explorations. Thus by means of my invention I am able to locate valuable mineral deposits associated with such geological formations which could not otherwise be located.

In practicing my invention I make use of the fact that sounds which are of long wave length (25 feet or more) are capable of being readily diffracted. Because of the nature of diffraction, I have found that it is possible for such sounds, originating at the surface of the earth, to travel diagonally downward through a stratum of earth having the characteristic of transmitting sound with comparatively low velocity, thence along a stratum of high sound valocity in a direction substantially parallel to the surface of contact between the two strata and then diagonally upward again through the upper stratum to the surface where it may be detected at a receiving station some distance from the point of origin. Where the sending and receiving stations are sufficiently far apart in relation to the depth of the underlying stratum and there is sufficient difference between the sound transmitting characteristics of the upper and lower strata, it is apparent that a sound wave following the indirect path indicated may arrive at the receiving station ahead of a sound wave travelling directly from the sending to the receiving station through the upper stratum. The sound wave which proceeds by the indirect path downward to and through the lower stratum and then upward through the upper stratum to the receiving station I call the "diffracted wave". The sound wave which passes directly between the two stations through the upper stratum I call the "direct wave". By providing means for accurately measuring the time of arrival of these waves I am able to make accurate deductions as to the character and location of the underlying stratum. And by changing the location of the sending and receiving stations and repeating the tests and comparing the results I provide data from which the depth, contour, slope and characteristics of the lower stratum may be accurately determined.

The principal objects of the invention are to utilize my discovery as a method for ascertaining matters of the character indicated and to provide simple and efficient apparatus for carrying it out.

Other objects and advantages of the invention will be made apparent by the following description of a preferred mode of operation of my invention taken in connection with the accompanying drawings, wherein Fig. 1 is a wiring diagram of transmitting and receiving stations adapted for carrying on the invention.

Fig. 2 illustrates a preferred form of geophone for use at the receiving station.

Fig. 3 illustrates a convenient method of recording relative times of arrival of sound waves, being a section of photographic film bearing graphic indications of the operation of the receiving devices shown in Fig. 1.

Figs. 4 and 5 are illustrative diagrams of the paths of sound waves through the earth, illustrating successive tests whereby the character, location and shape of the sub-surface formation may be determined.

Referring to Fig. 1, an explosive charge 10 is buried just far enough below the surface of the ground so that its detonation will produce suitable sound waves through the earth. In general it is sufficient to locate the charge at a depth of 10 to 20 feet below the surface for this purpose. A second explosive charge 11 is preferably placed for detonation at the surface of the earth immediately above the charge 10. Nearby may be located a wireless transmitter 12. All of the above-described devices are located at the sending station hereinafter referred to as A. The explosive charges 10 and 11 and the wireless transmitter 12 are preferably connected by electric wires 13 with a suitable source of electrical energy, not shown, and any appropriate means is provided for simultaneously detonating the charges and operating the wireless transmitter circuit so that three sets of waves may be simultaneously propagated from the sending station, being (1) sound waves of long wave length, characteristic of the detonation of an explosive charge, from the charge 10 through the earth, (2) a second set of sound waves from the charge 11 through the air, and (3) a set of radio frequency waves from the transmitter 12.

At the receiving station, hereinafter referred to as B, are located means for detecting sound waves through the earth, sound waves through the air and radio frequency waves. The earth impulses may be detected by means of a geophone 14 or other appropriate apparatus, the sound waves through the air may be detected by a microphone 25, and the radio frequency waves may be detected by any appropriate form of radio receiver 17. Any one of the well known forms of microphone may be employed which is sensitive to sounds of long wave length such as those produced by the detonations of explosive charges. The geophone 14 and the microphone 25 may be electrically connected by wires 15 to the input of an amplifier 16, which in turn is suitably connected to operate the oscillograph element 18. If desired, separate oscillographs may be employed for the geophone and for the microphone respectively. The wireless receiver 17 is connected to operate an oscillograph element 19. These oscillograph elements are installed in and constitute a part of the oscillograph recorder 20. The arrangement of the source of light 22, the oscillograph elements 18 and 19 and the mechanism 21 for moving the film 26 is well known to those versed in the use of such instruments. The oscillograph recorder is also provided with a suitable device for recording equal time intervals, such as a tuning fork 23 provided with slits through which light may pass from a lamp 24 to the film 26, which has been found to work successfully, though any other appropriate means may be employed.

A special form of geophone, well adapted to use for practicing this invention, is shown in Fig. 2. It consists of an element possessing inertia and which is free to move relatively to a second element which is imbedded in the earth. The two elements are coupled electromagnetically or electrostatically in such manner that an electrical potential is generated in an electric circuit by relative movement between the two elements. In the form of geophone illustrated in this figure the fixed element 30 constitutes a magnet having pole pieces 31, 31, 31. The magnet may either be a permanent magnet or may be an electro-magnet. The inertia element is a coil 32 freely suspended from the fixed bracket 34 and adapted to move up and down relative to the pole pieces 31 when the latter are oscillated by earth vibrations. This relative movement generates an electrical potential at the terminals of the coils 32 which is conveyed by wires 15 to the amplifier 16 and oscillograph element 18 above described. This form of geophone is not essential to the invention but is advantageous for use in connection therewith.

The operation of the invention may be illustrated by reference to Fig. 4 in which the line A—B represents the surface of the earth. 1—1 represents a stratum of the earth having relatively low speed sound transmitting characteristics and 2—2 represents an underlying stratum having relatively high speed sound transmitting characteristics. The surface of contact between the upper and lower strata is indicated by the line M—N.

In order to determine the presence of a sub-surface formation having relatively high speed sound transmitting characteristics, sending and receiving stations such as those illustrated in Fig. 1 may be set up on the surface of the ground at points A and B respectively. When the various recording devices at B are in readiness the electric circuit 13 at A may be energized to simultaneously propagate the sound waves from charges 10 and 11 and radio frequency waves from transmitter 12 as above described.

The points A and B may be located a mile or more apart and preferably at a distance greater than four times the estimated depth of the sub-surface formation 2—2 to be examined.

Upon energizing the circuit 13—13 at A three sets of waves are propagated. First a radio frequency wave which instantly energizes the wireless receiver 17 at B and causes a record to be made on film 26 through oscillograph element 19. The time of travel of the wireless impulse being negligible, a record is thus made on film 26 at the instant of detonation of charges 10 and 11.

Second, a sound wave through the air from explosive charge 11 which in due course is received at microphone 25 and recorded on film 26.

Third, a sound wave through the earth from charge 10 to geophone 14.

If a high-speed sound transmitting stratum underlies the surface stratum where the tests are being made, this sound wave through the earth will be divided and will reach B in the form of two or more sets of vibrations as I will now explain.

The wave set up by detonation of charge 10 spreads in all directions from A on a substantially spherical wave front. The portion of it that proceeds directly to B on the line AB in stratum 1—1 I have called the "direct wave". Its time of arrival at B will depend on the distance AB and the velocity, $V_1$, of sound through the medium 1—1. Another portion of the wave from charge 10 will proceed straight downward on the line AE, other portions diagonally downward on the lines AF, AG, AH, AJ, etc., with velocities depending on the character of the medium through which they travel, and if it is homogeneous in character they will all proceed with substantially the same velocity $V_1$, through the stratum 1—1 and with a substantially spherical wave front.

But an important change in the wave front occurs at the plane of contact MN between the strata 1—1 and 2—2. The wave proceeding on the line AE perpendicular to plane MN will be broken up at E, the major portion proceeding in the same line toward E' and other portions proceeding radially in all directions from E by diffraction in accordance with the theory of propagation of impulses known as "Huygen's principle" (p. 159 "Theory of Optics"—Drude, translated by Mann & Milliken). One of these diffracted waves will proceed from E on the line EK substantially along the plane of contact MN between the upper and lower strata 1—1 and 2—2.

Meanwhile another portion of the original sound wave from A proceeding on line AF will reach plane MN at F. The major portion of it will be refracted, on well known principles, so that it will proceed with increased velocity on line FF' through stratum 2—2, another portion will be reflected back through stratum 1—1 to point F'' at the surface, and other portions will be diffracted radially from F through 2—2, a portion of the diffracted wave proceeding on line EFK in plane MN.

Another portion of the original sound wave from A will strike plane MN at G. Its refracted portion will continue through stratum 2—2 on line GG', its reflected portion will travel back through stratum 1—1 on line GG'', and a diffracted portion will travel toward K in the plane MN.

It is well known in the science of optics and sound propagation that there is a critical angle of refraction between media of different density such that when the angle of incidence of the wave impulse exceeds this critical angle, no refraction occurs. This angle depends on the relation of the velocities of transmission of the impulses through the two media and is expressed as follows:

$$\theta = \sin^{-1}\frac{V_1}{V_2} \quad (1)$$

where $\theta$ is the critical angle of refraction, $V_1$ is the velocity with which the impulse travels through low speed sound transmitting medium, and $V_2$ is the velocity with which it travels through the higher speed sound transmitting medium.

According to this theory, the portion of the original sound wave from A proceeding on the line AH, where the line AH makes the critical angle of refraction with plane MN, will have no refracted portion through stratum 2—2, but there will be reflection on line HH'' and diffraction radially from H, a portion of the diffracted wave proceeding on line EHK.

Thus it appears that the original sound wave at A will transmit sound energy in line EK by diffraction due to the length of the original sound waves and the difference in sound velocities of the media on either side of the separating plane MN.

By further operation of Huygen's principle, diffraction of the sound energy in line EK occurs at each point in its travel, as, for example at points P and K and from each of these points a diffracted impulse proceeds toward B to effect vibration of the geophone 14 and make a resulting record on film 26.

The diffusion of the sound through this repeated diffraction would result in very feeble vibrations at B were it not for the fact that they tend to reinforce each other with a maximum intensity just following the instant of reception of the diffracted sound wave which has followed the shortest time path through plane MN from A to B, so that with the instruments I have provided a very clear record of the arrival of the diffracted wave at B appears in film 26 if there be no substantial interference by other sounds.

I have found that the order of arrival of these diffracted wave portions from A to B via plane MN depends on their course of travel through the media 1—1 and 2—2 of different sound velocities and that that diffracted portion reaches B first which travels from A to MN and from MN to B on the lines AH and KB which form with MN angles complementary to the critical angle of refraction above referred to. For $$t = \frac{(L - 2D \tan \Theta)}{V_2} + \frac{2D}{V_1 \cos \Theta} \quad (2)$$

where
$t$ = the time of travel of the diffracted wave,
$L$ = the distance between A and B, and
$D$ = the depth of MN below the surface, i. e., the length of line AE.

When $t$ is a minimum, that is, when the angle $\Theta$ is such that the path AHKB is the shortest time path, then $$\frac{dt}{d\Theta} = 0 \quad (3)$$

Differentiating the equation (2) with respect to $\Theta$, $$\frac{dt}{d\Theta} = \frac{2D}{V_2 \cos^2 \Theta} = \frac{2D \sin \Theta}{V_1 \cos^2 \Theta} = 0 \quad (4)$$

$$\sin \Theta = \frac{V_1}{V_2} \quad (5)$$

I presume that the reinforcing of the diffracted wave referred to above is due to the fact that although the energy which follows the shortest time path AHKB arrives first, the energy travelling by line AGKB will tend to reinforce the energy travelling by line AHKB for its path though longer in the aggregate is shorter through the low velocity stratum; and likewise the energy travelling by lines AJKB and AHPB will tend to reinforce the energy travelling by line AHKB for their paths though shorter in the aggregate are longer through the low velocity medium. Thus the diffracted wave is built up to such magnitude that if it arrives ahead of the direct wave from A to B through stratum 1—1 it is clearly distinguishable on film 26 from the vibrations recording the normal unrest of the ground. The first vibration of the group of vibrations caused by the diffracted waves may therefore be read as indicating the arrival of the diffracted wave which has come by the shortest time path, AHKB.

The record of arrival of these four sets of waves (i. e., the radio frequency wave, the sound wave through the air, and the direct wave and the diffracted wave through the earth) at station B will appear on the film 26, when the same has been developed, somewhat as shown in Fig. 3. Referring to that figure the line Q—Q is the record made by the oscillograph element 19 under control of the wireless receiver 17. The line R—R is the record made by the oscillograph element 18 under combined control of the microphone 25 and the geophone 14 through amplifier 16. The lines S—S represent time intervals recorded by tuning fork 23. (One hundredth second intervals have been found to be satisfactory.)

The sharp break in line Q—Q at point O indicates the instant of arrival of the radio frequency wave and therefore the instant of explosion of charges 10 and 11. This marks the zero instant of the test and all other time intervals may be read by counting the number of line S—S between O and the point in question. The vibrations in line R—R up to the point X represent the normal earth tremors detected by geophone 14. The vibrations of line R—R between points X and X′ represent the record of diffracted sound waves received through geophone 14. The vibrations between points Y and Y′ represent the record of direct sound waves received through geophone 14. The vibrations of line R—R following point Z represent the record of sound waves from explosion 11 received through the air by microphone 25.

By counting the time interval lines S—S between point O on line Q—Q and point Z on line R—R the exact elapse of time between the propagation of the sound wave from charge 11 at A and its receipt at B may be determined. The distance between A and B may then be accurately calculated from the known velocity of sound through the air with corrections for temperature, altitude, wind, etc. Other appropriate means may be employed for determining the distance A—B but I have found it more convenient to proceed as above indicated rather than by surveying or measuring the distance and there is the further advantage in the present method that it makes the distance reading a part of a single record strip upon which all of the data for calculations are based.

Inasmuch as the direct wave from A to B through stratum 1—1 produces vibrations of line R—R of greater amplitude than those produced by the diffracted wave, I am able to identify and distinguish the respective vibrations which come through the earth. As a rough check on this method of distinguishing the two sound records it is desirable by preliminary test to determine the velocity of transmission of sound through the surface stratum 1—1. With this velocity known and the distance A—B known it is possible to estimate the expected time of arrival of the direct wave vibrations. If this estimation shows that the direct wave vibrations should not normally arrive at B until the beginning of vibrations Y—Y′ of line R—R then there is no explanation for the vibrations of line R—R recorded between points X and X′ other than that they are sound vibrations which have come more rapidly either than the direct wave from charge 10 or than the sound wave through the air from charge 11. The record of the vibrations between points X and X′ therefore indicates without question the presence of a high-speed sound transmitting stratum in the earth somewhere below and between points A and B.

When the presence of the high-speed stratum 2—2 has thus been ascertained accurate data as to its character, location and depth may be collected by repeating the tests and making new records for different locations of points A and B. For example, the sending station A may be moved to a new location $A_2$ further away from B on line AB and new charges 10 and 11 set and detonated as above described. From the film strip 26 made in this second test, it will be possible to calculate as above the distance between the sending and receiving stations $A_2$ and B and the time of travel of the diffracted wave by the shortest time path $A_2H_2KB$. Since the distance $A_2A=H_2H$, the time of travel of the diffracted wave from $H_2$ to H may be calculated. This gives the velocity of sound travel, $V_2$, through the high-speed medium 2—2, and permits the solution of equations (1) and (5) above and the determination of the angle $\theta$. With this angle known, equation (2) may be resolved to determine the depth of the plane MN below the ground.

A direct equation for determining the depth D of the lower stratum below the surface of the ground is as follows:

$$D=\frac{V_1}{2\cos\theta}\left(t-\frac{L}{V_2}\right) \quad (6)$$

This assumes that the line HK in plane MN is parallel to the line AB at the surface. The equation (6) may be more generally written $$D_a+D_b=\frac{V_1}{\cos\theta}\left(t-\frac{L}{V_2}\right) \quad (7)$$

where $D_a$ is the depth of plane MN below the surface at A and $D_b$ is the depth of plane MN below the surface at B.

The slope of the plane MN may be determined by making tests and observations as above at three surface station A, B and U located in triangular relation. If the tests and observations be made in the following order A to B, B to U, U to A, then $$\begin{aligned}D_a+D_b&=\frac{V_1}{\cos\theta}\left(t_a-\frac{L_a}{V_2}\right)\\ D_b+D_u&=\frac{V_1}{\cos\theta}\left(t_b-\frac{L_b}{V_2}\right) \quad (8)\\ D_u+D_a&=\frac{V_1}{\cos\theta}\left(t_u-\frac{L_u}{V_2}\right)\end{aligned}$$

where $t_a, t_b, t_u$ indicate the times of travel of the diffracted waves by the shortest time path from A to B, B to U, and U to A respectively, and $L_a, L_b, L_u$ indicate the respective distances between AB, BU and UA. By solving these equations simultaneously the depths to plane MN may be determined and the three points thus located serve to indicate the sloping boundary plane between strata 1—1 and 2—2.

In this manner anticlines and other high-speed sound transmitting formations may be definitely located, their depth and upper boundaries determined, and their physical characteristics may be judged from the speed with which they transmit sound.

In addition, the edges and contour of sub-surface formations such as salt domes and the like may determined by the application of this invention in the manner now to be explained.

After generally locating the formation by random tests, the receiving station B (see Fig. 5) is set up at a point on the surface AB and as nearly as can be centrally over the supposed position of the sub-surface formation to be examined. The sending station is then set up successively at positions $A_1, A_2, A_3$ etc., on line BA such that A is successively at greater distances beyond the supposed position of the edge to be located. By making and recording tests from these different positions of the sending station it is possible to make determinations as follows:

Let $t_1, t_2, t_3$ equal the times required for travel of the diffracted wave from $A_1, A_2, A_3$ respectively to B, and let $$\begin{aligned}\Delta t_1&=t_2-t_1\\ \Delta t_2&=t_3-t_2\\ L_1&=\overline{A_2B}-\overline{A_1B}\\ L_2&=\overline{A_3B}-\overline{A_2B}\end{aligned}$$

Then draw the lower left hand limb of the hyperbola $$\frac{4V_1^2X^2}{\Delta t_1^2}-\frac{Y^2}{4L_1^2-\frac{\Delta t_1^2}{4V_1^2}}=1 \quad (9)$$

where $X$'s are abscissas and $Y$'s are ordinates with the origin at $A_2$. This hyperbola appears on Fig. 5 as $a_3h_3$. Also draw the lower left hand limb of the hyperbola $$\frac{4V_1^2X^2}{\Delta t_2^2}-\frac{Y^2}{4L_2^2-\frac{\Delta t_2^2}{4V_1^2}}=1 \quad (10)$$

where $X$'s are abscissas and $Y$'s are ordinates with the origin at $A_3$. This hyperbole appears on Fig. 5 as $a_3h_3$. The intersection, H, of these two hyperbolas indicates the point sought, i. e., the edge of the formation under examination.

This point may also be found by solution of the simultaneous equations:

$$\frac{4V_1^2X^2}{\Delta t_1^2}-\frac{Y^2}{4L_1^2-\frac{\Delta t_1^2}{4V_1^2}}=1$$

and $\quad(11)$ $$\frac{4V_1^2(X+L_2)^2}{\Delta t_2^2}-\frac{Y^2}{4L_2^2-\frac{\Delta t_2^2}{4V_1^2}}=1$$

using the point $A_2$ as the origin.

Similarly the opposite edge of the sub-surface formation may be located, and then, by placing the sending station at various points on other lines radiating from B, the location of the edge of the formation under these lines may be determined. It will generally be found necessary to change the location of the receiving station, B, from time to time in order to get the clearest results. It may be found, for example, that B is so close to one edge of the formation that the direct wave through 1—1 reaches B before the diffracted wave. Since the vibrations recorded on film 26 by the direct wave are generally of much greater amplitude and duration than those recorded by the diffracted wave, the latter are not easily distinguishable from the former unless they reach B first. Accordingly, if vibrations from the direct wave appear first on the record, it is because the path HK of the diffracted wave through plane MN is too short. This is likely to be the case if B is too near the edge of the formation and in such case it is desirable to draw B back to a new position more nearly over the supposed center of the formation. Where the formation is extensive it may be necessary to make many changes in the position of B as well as of A.

No confusion is likely to occur between the record of the sound waves through the air and those through the ground for the latter travel with many times the velocity of the former. Thus the zone of vibrations YY' on film 26 due to the ground waves set up by explosion of charge 10 will have long since subsided and passed before the first sound of the explosion of charge 11 reaches microphone 25 through the air. For this reason I prefer to provide a single oscillograph 18, but separate oscillographs or other recording devices for the microphone 25 and geophone 14 may be provided as desired.

I am aware that it has been proposed to investigate sub-surface ores by means of observations as to the velocity and inflection of sound waves of short wave length electrically produced and transmitted between instruments located in borings as deep in the earth as the formation under examination. But my invention is quite distinct from such proposal in that I make use of the principle of diffraction of sound waves by employing sounds having long wave length so that, instead of observing the refracted or reflected waves as in the earlier proposal, I make use of the diffracted waves. I thereby obviate the necessity of deep borings and provide means as well for determining with accuracy the size, shape, depth, slope and other characteristics of the formation which have not previously been ascertainable by any means within my knowledge other than actual excavation or sinking of shafts.

My invention results from the discovery that certain sounds may be diffracted under the conditions described and that despite diffusion of the diffracted sound the momentary reinforcement of the sound immediately following the arrival at the receiving station of the diffracted wave by the shortest time path is sufficient to energize sensitive receiving and recording apparatus of the character described so that the record of the time of arrival of the diffracted wave by the shortest time path may be distinguished from the record of normal unrest of the ground. The time of travel of this diffracted wave may thus be made available for use in the many calculations and deductions referred to.

The devices and combinations which I have described and prefer to employ as constituting the sending station are well adapted for propagation of sounds of the character required to secure diffraction under the stated conditions of use. The devices described as constituting the receiving station are peculiarly adapted for receiving and accurately recording impulses of the character employed. But it will be obvious to those skilled in the art from the foregoing description that many changes, omissions and additions may be made in the apparatus and combinations of devices described without departing from my invention.

The preferred form of geophone described and illustrated herein is not essential to my broad invention but is novel in itself and is especially adapted for the use described because of its high sensitivity to sounds of long wave length and because it permits amplification and recording of the vibrations of electric potential set up in circuit 15—15 by the ground impulses without substantially distorting the record as in the case of other devices.

By my preferred combination of sending, receiving and recording devices I am able to make accurate time measurements, to calculate distances accurately without the use of surveying instruments or measures, to provide data with negligible factors of error, to provide simple and efficient apparatus for carrying on the process, and to accomplish results in the investigation and determination of characteristics of sub-surface geological formations which are novel and important and capable of a wide variety of uses.

While I have described my invention in connection with preferred forms and combinations of devices, it will be understood that I do not thereby intend to restrict myself to such illustrative means as I intend to include in my invention all possible modifications and variations in method and apparatus which fall within the scope of the appended claims.

What I claim as new and desire to secure by Letters Patent of the United States is:—

1. In a system for locating subsurface formations, the combination of means for simultaneously transmitting a sound of long wave length and a radio frequency wave, means for receiving said radio frequency wave, means for receiving the diffracted wave by the shortest time path resulting from said sound wave and means for recording said waves as they are received.

2. In a system for locating subsurface formations, the combination of means for simultaneously transmitting sound waves through the earth and through the air and transmitting a radio frequency wave, means for receiving said radio frequency wave, means for receiving said waves transmitted through the earth, means for receiving the waves transmitted through the air and means for recording said waves as they are received.

3. In a system for locating subsurface formations, the combination of a transmitting station having a source of radio frequency waves and a source of mechanical impulses, and a receiving station having means for receiving said radio frequency waves, means for receiving said mechanical impulses and means for recording said waves and said impulses as they are received.

4. In a system for locating subsurface formations, a source of radio frequency waves, a source of mechanical impulses, means for receiving said radio frequency waves, means for receiving said mechanical impulses, means for determining the time of travel of said impulses through the subsurface formation and means for determining the time of travel of said impulses through the media overlying said formation.

5. In a system for locating subsurface formations, a source of radio frequency waves, means for producing mechanical impulses through the air and through the ground, means for causing the simultaneous transmission of said radio frequency waves and said mechanical impulses, means for receiving and recording said radio frequency waves at a point distant from that of transmission means for receiving said mechanical impulses at the same point, and means for separately recording the time of arrival of said mechanical impulses through the air and the direct and diffracted impulses resulting from said mechanical impulse through the ground.

6. The method of locating subsurface formations which comprises transmitting radio frequency waves, transmitting sound waves through the earth simultaneously therewith, receiving said radio frequency waves at a point distant from the transmitting station, automatically recording the time of arrival of said waves at the receiving point, receiving said impulses travelling through the earth and automatically recording the time of their arrival at the same point.

7. The method of locating subsurface formations which comprises transmitting radio frequency waves, transmitting mechanical impulses through the earth simultaneously therewith, receiving and recording said radio frequency waves at a point distant from the transmitting station, receiving said mechanical impulses at the same point, and recording the time required for said impulses to travel through the formation under observation and to travel directly through the earth from the transmitting station to the point of reception.

8. The method of locating subsurface formations which comprises transmitting radio frequency waves, transmitting mechanical impulses through the earth and through the air simultaneously therewith, receiving and recording said radio frequency waves at a point distant from the transmitting station, receiving said mechanical impulses at the same point, and receiving and recording the time of arrival of said impulses through the earth and through the air and the time intervals between the arrival of such impulses.

9. The method of locating subsurface formations which comprises transmitting radio frequency waves, transmitting mechanical impulses through the earth and through the air simultaneously therewith, receiving and recording said radio frequency waves at a point distant from that of transmission, receiving said impulses at the same point and automatically recording the time required for said impulses to travel through the formation under observation, the time required for said impulses to travel directly through the earth and the time required for said impulses to travel through the air.

10. Mechanism of the character described including in combination means for producing a sound of long wave length through the earth and simultaneously making a time record at a distant receiving station and means at said station for making a time record at the instant of arrival of the diffracted sound by the shortest time path through the earth and for recording the time interval between the two time records.

11. Mechanism of the character described including in combination means for simultaneously producing sounds of long wave length through the air and earth from a common sending station and making a time record at a distant receiving station at the instant of such propagation, and receiving devices at the receiving station sensitive to such sounds and adapted to make a time record of the arrival of the same and to record the time interval between such time records.

In testimony whereof, I have signed my name to this specification.

JOHN CLARENCE KARCHER.

CERTIFICATE OF CORRECTION.

Patent No. 1,706,066.                                    Granted March 19, 1929, to

JOHN CLARENCE KARCHER.

It is hereby certified that error appears in the printed specification of the above numbered patent requiring correction as follows: Page 5, line 107, for "$a_3 h_3$" read "$a_2 h_2$"; and that the said Letters Patent should be read with this correction therein that the same may conform to the record of the case in the Patent Office.

Signed and sealed this 23rd day of April, A. D. 1929.

(Seal)                                                           M. J. Moore,
                                                                       Acting Commissioner of Patents.